US012759592B2

(12) United States Patent
Iwahori et al.

(10) Patent No.: US 12,759,592 B2
(45) Date of Patent: Oct. 13, 2026

(54) CONTROL DEVICE AND CONTROL SYSTEM

(71) Applicant: TOYOTA JIDOSHA KABUSHIKI KAISHA, Toyota (JP)

(72) Inventors: Kento Iwahori, Nagoya (JP); Shogo Yasuyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/813,630

(22) Filed: Aug. 23, 2024

(65) Prior Publication Data

US 2025/0153742 A1 May 15, 2025

(30) Foreign Application Priority Data

Nov. 15, 2023 (JP) ................................ 2023-194048

(51) Int. Cl.
*B60W 60/00* (2020.01)

(52) U.S. Cl.
CPC ....... *B60W 60/005* (2020.02); *B60W 2556/45* (2020.02); *B60W 2756/10* (2020.02)

(58) Field of Classification Search
CPC ........... B60W 60/005; B60W 2556/45; B60W 2756/10; B60W 50/029; G05D 1/221
See application file for complete search history.

(56) References Cited

U.S. PATENT DOCUMENTS

| | | | | |
|---|---|---|---|---|
| 10,732,625 | B2 * | 8/2020 | Weinstein-Raun | G05D 1/0027 |
| 2017/0320529 | A1 | 11/2017 | Nordbruch | |
| 2019/0163176 | A1 * | 5/2019 | Wang | G05D 1/0027 |
| 2019/0215668 | A1 * | 7/2019 | Kenane | G08G 1/096725 |
| 2020/0148218 | A1 * | 5/2020 | Huang | B60W 30/18 |
| 2020/0333778 | A1 * | 10/2020 | Lambert | G05D 1/0022 |
| 2022/0137615 | A1 * | 5/2022 | Eperjesi | G05D 1/0027 701/2 |

FOREIGN PATENT DOCUMENTS

| | | | | |
|---|---|---|---|---|
| DE | 102018130815 A1 * | 6/2020 | | B60W 60/0055 |
| JP | 2017-538619 A | 12/2017 | | |
| JP | 2021-011233 A | 2/2021 | | |
| JP | 2023-126862 A | 9/2023 | | |
| KR | 20230118745 A * | 8/2023 | | G05D 1/226 |

* cited by examiner

*Primary Examiner* — Hitesh Patel
*Assistant Examiner* — Tabitha Kress
(74) *Attorney, Agent, or Firm* — SoraIP, Inc.

(57) ABSTRACT

The control device used for moving the moving object movable by the unmanned driving includes an acquisition unit that acquires a result of inspection of the mounted device, a determination unit that determines whether movement by the remote manual driving mode is possible using the result of inspection, and a setting unit that sets the driving mode of the moving object to the remote manual driving mode when it is determined that movement by the remote manual driving mode is possible.

7 Claims, 7 Drawing Sheets

CONTROL DEVICE AND CONTROL SYSTEM

CROSS-REFERENCE TO RELATED APPLICATION

This application claims priority to Japanese Patent Application No. 2023-194048 filed on Nov. 15, 2023, incorporated herein by reference in its entirety.

BACKGROUND

1. Technical Field

The present disclosure relates to control devices and control systems.

2. Description of Related Art

Conventionally, a technique of remotely controlling a vehicle to perform autonomous driving has been known in the art (Japanese Unexamined Patent Application Publication (Translation of PCT Application) No. 2017-538619 (JP 2017-538619 A)).

SUMMARY

When a mounted device mounted on a moving object such as a vehicle fails, an operator sometimes directly moves the moving object by riding and operating the moving object or by transporting the moving object using a towing device etc. However, when the operator directly moves the moving object, the number of man-hours required to move the moving object may increase.

The present disclosure can be implemented in the following aspects.

(1) One aspect of the present disclosure provides a control device. In a control device used to move a moving object that is movable by unmanned driving, the moving object has a remote manual driving mode in which the moving object receives a manual control signal and moves using the received manual control signal, the manual control signal being a signal generated according to an operation of a maneuvering device by an external operator to control movement of the moving object, and the maneuvering device being located at a different location from the moving object, the moving object includes a mounted device mounted on the moving object, and the control device includes an acquisition unit that acquires a result of inspection of the mounted device, a determination unit that determines based on the result of inspection whether the moving object is movable in the remote manual driving mode, and a setting unit that sets a driving mode of the moving object to the remote manual driving mode when determination is made that the moving object is movable in the remote manual driving mode. According to this aspect, the acquisition unit can acquire the result of inspection of the mounted device. The determination unit can determine based on the result of inspection of the mounted device whether the moving object is movable in the remote manual driving mode. The setting unit can set the driving mode of the moving object to the remote manual driving mode when determination is made that the moving object is movable in the remote manual driving mode. With the above configuration, when the mounted device fails, the operator can move the moving object in the remote manual driving mode without directly moving the moving object. This can reduce the number of man-hours required to move the moving object compared to the case where the operator directly moves the moving object.

(2) In the above aspect, the moving object may further have an automated driving mode in which the moving object moves using an automated control signal, the automated control signal being a signal generated not according to the operation by the external operator to control the movement of the moving object, the determination unit may determine whether the moving object is movable in the automated driving mode, and when determination is made that the moving object is not movable in the automated driving mode, determines whether the moving object is movable in the remote manual driving mode, and the setting unit may set the driving mode of the moving object to the remote manual driving mode when the determination is made that the moving object is not movable in the automated driving mode and that the moving object is movable in the remote manual driving mode. According to this aspect, the determination unit can determine based on the result of inspection of the mounted device whether the moving object is movable in the automated driving mode. When determination is made that the moving object is not movable in the automated driving mode, the determination unit can determine whether the moving object is movable in the remote manual driving mode. The setting unit can set the driving mode of the moving object to the remote manual driving mode when the determination is made that the moving object is not movable in the automated driving mode and that the moving object is movable in the remote manual driving mode. With the above configuration, even when the moving object cannot be moved in the automated driving mode, the operator can move the moving object in the remote manual driving mode without directly moving the moving object. This can reduce the number of man-hours required to move the moving object compared to the case where the operator directly moves the moving object.

(3) In the above aspect, the determination unit may determine that the moving object is movable in the remote manual driving mode in either or both of the following cases:

a case where a function of the mounted device that contributes to the determination that the moving object is not movable in the automated driving mode is able to be compensated for by the external operator, and a case where, when a plurality of the mounted devices is inspected, a function of one of the mounted devices that contributes to the determination that the moving object is not movable in the automated driving mode is able to be compensated for by a function of another one of the mounted devices that is different from the one mounted device. According to this aspect, in the case where a function of the mounted device that contributes to the determination that the moving object is not movable in the automated driving mode is able to be compensated for by the external operator, the determination unit can determine that the moving object is movable in the remote manual driving mode. According to this aspect, when a plurality of the mounted devices is inspected, there is a case where a function of one of the mounted devices that contributes to the determination that the moving object is not movable in the automated driving mode is able to be compensated for by a function of another one of the mounted devices that is different from the one mounted device. In this case, the determination unit can determine that the moving object is movable in the remote manual driving mode.

(4) In the above aspect, when the mounted device that contributes to the determination that the moving object is not movable in the automated driving mode is either or both of a mounted sensor that is a sensor mounted on the moving object and an electric parking brake, the determination unit may determine that the moving object is movable in the remote manual driving mode. According to this aspect, when the mounted device that contributes to the determination that the moving object is not movable in the automated driving mode is either or both of the mounted sensor that is a sensor mounted on the moving object and the electric parking brake, the determination unit can determine that the moving object is movable in the remote manual driving mode.

(5) Another aspect of the present disclosure provides a control system. A control system used to move a moving object that is movable by unmanned driving includes:

a moving object on which a mounted device is mounted and that has a remote manual driving mode;

an acquisition unit that acquires a result of inspection of the mounted device;

a determination unit that determines based on the result of inspection whether the moving object is movable in the remote manual driving mode; and a setting unit that sets a driving mode of the moving object to the remote manual driving mode when determination is made that the moving object is movable in the remote manual driving mode.

When in the remote manual driving mode, the moving object receives a manual control signal and moves using the received manual control signal, the manual control signal being a signal generated according to an operation of a maneuvering device by an external operator to control movement of the moving object, and the maneuvering device being located at a different location from the moving object. According to this aspect, the acquisition unit can acquire the result of inspection of the mounted device. The determination unit can determine based on the result of inspection of the mounted device whether the moving object is movable in the remote manual driving mode. The setting unit can set the driving mode of the moving object to the remote manual driving mode when determination is made that the moving object is movable in the remote manual driving mode. With the above configuration, when the mounted device fails, the operator can move the moving object in the remote manual driving mode without directly moving the moving object. This can reduce the number of man-hours required to move the moving object compared to the case where the operator directly moves the moving object.

The present disclosure can be implemented in various forms other than the control device and the control system. For example, the present disclosure can be implemented in the following forms: a control device, a control system, and a method for manufacturing a moving object; a control device, a control system, and a method for controlling a moving object; a computer program that implements the control method; and a non-transitory recording medium recording the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
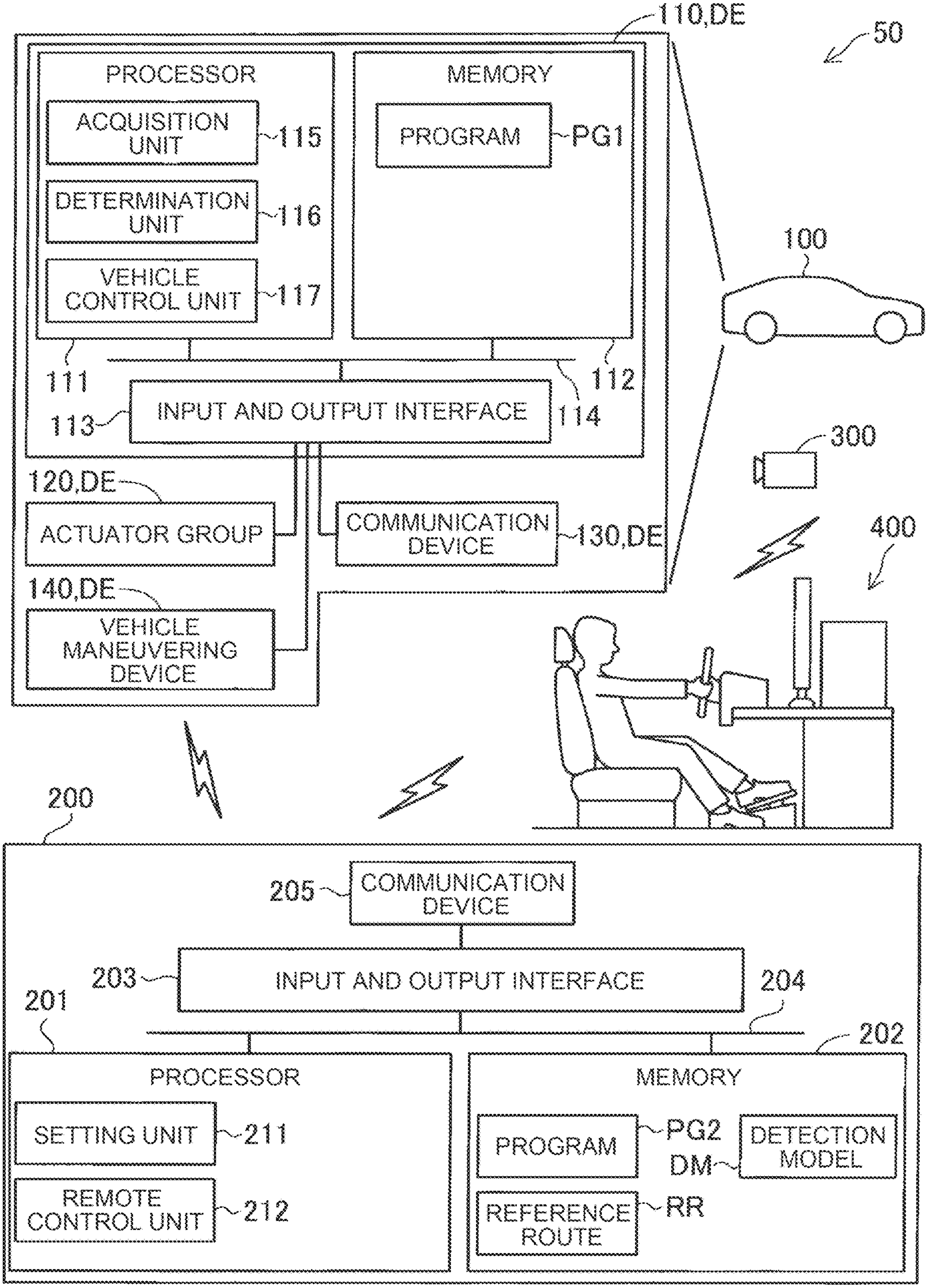
FIG. 1 is a conceptual diagram illustrating a configuration of a control system according to a first embodiment.

FIG. 1 is a conceptual diagram illustrating a configuration of a control system 50 according to a first embodiment. The control system 50 includes one or more external sensors 300, one or more vehicles 100 as a moving object, a server 200, and a remove remote maneuvering device 400.

The external sensor 300 is a sensor located outside the vehicle 100. The external sensor 300 in the present embodiment is a sensor that captures the vehicle 100 from the outside of the vehicle 100. The external sensor 300 includes a communication device (not shown), and can communicate with another device such as the server 200 by wired communication or wireless communication.

Specifically, the external sensor 300 is constituted by a camera. The camera as the external sensor 300 captures a captured image including the vehicle 100, and outputs the captured image as a detection result. Hereinafter, a camera as the external sensor 300 is also referred to as an "external camera".

In the present disclosure, the "moving object" means a movable object, and is, for example, the vehicle 100 or an electric vertical takeoff and landing machine (so-called flying vehicle). The vehicle 100 may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles 100 include battery electric vehicle (BEV), gasoline-powered vehicles, hybrid electric vehicle, and fuel cell electric vehicle. When the moving object is other than the vehicle 100, the expressions of "vehicle" and "vehicle" in the present disclosure can be appropriately replaced with "moving object", and the expression of "traveling" can be appropriately replaced with "moving".

The vehicle 100 is configured to be able to travel by unmanned driving. The term "unmanned driving" means driving that does not depend on the traveling operation of the occupant. The traveling operation means an operation related to at least one of "running", "turning", and "stopping" of the vehicle 100. The unmanned driving is realized by automated or manual remote control using a device located outside the vehicle 100 or by autonomous control of the vehicle 100. An occupant who does not perform the traveling operation may be on the vehicle 100 traveling by the unmanned driving. The occupant who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Herein, "remote control" includes "full remote control" in which all of the movements of the vehicle 100 are completely determined from the outside of the vehicle 100, and "partial remote control" in which part of the movements of the vehicle 100 is determined from the outside of the vehicle 100. Also, "autonomous control" includes "full autonomous control" and "partial autonomous control". In "fully autonomous control", the vehicle 100 autonomously controls its own movement without receiving any information from a device external to the vehicle 100. In "partial autonomous control", the vehicle 100 autonomously controls its own movement by using information received from a device outside the vehicle 100.

In this embodiment, the control system 50 is used in a factory that manufactures the vehicle 100. The factory reference coordinate system is a global coordinate system. That is, any position in the plant is represented by the coordinates of X, Y, Z in the global coordinate system. The factory includes a first location and a second location. The first location and the second location are connected by a track on which the vehicle 100 can travel. In the factory, a plurality of external sensors 300 are installed along the runway. The position of each external sensor 300 in the factory is adjusted in advance. The vehicles 100 move from the first location to the second location through the runway in accordance with at least one of the traction driving mode, the manned driving mode, the remote manual driving mode, and the automated driving mode according to the result of inspection of the mounted device DE.

The mounted device DE is a device mounted on the vehicle 100. The mounted device DE is, for example, a motion control system device, a mounting sensor, and an electric parking brake. The motion control system device is a mounted device DE for implementing the following three functions of the vehicle 100: "run," "turn," and "stop." The motion control system device is, for example, a disc brake device having an electric power steering, a brake pump, and the like, an engine, a traveling motor, and an electric shift. The mounted sensor is a sensor mounted on the vehicle 100. Examples of the mounted sensor include an acceleration sensor, a yaw rate sensor, a millimeter wave radar, an in-vehicle camera, an in-vehicle LiDAR, and a steering angle sensor. Note that the type of the mounted device DE is not limited to the above.

In the towing driving mode, the vehicle 100 moves by being towed by a device other than the host vehicle 100, such as a towing device, without making any movement.

In the manned driving mode, the vehicle 100 travels by the traveling operation of the occupant. In the automated driving mode, the vehicle 100 travels in one of a remote automated driving mode in which automated remote control is performed using a device located outside the vehicle 100 and an autonomous driving mode in which autonomous control of the vehicle 100 is performed. In the present embodiment, of the automated driving mode, the vehicle 100 travels in the remote automated driving mode in which automated remote control is performed using the server 200 as a device located outside the vehicle 100. In the remote manual driving mode, the vehicle 100 travels by manual remote control using a device located outside the vehicle 100. In the present embodiment, in the remote manual driving mode, the vehicle 100 travels by manual remote control using the server 200 and the remote maneuvering device 400.

The vehicle 100 includes a vehicle control device 110 for controlling each unit of the vehicle 100, an actuator group 120 including one or more actuators driven under the control of the vehicle control device 110, and a communication device 130. The communication device 130 communicates with an external device such as the server 200 by wireless communication. The actuator group 120 includes an actuator of a driving device for accelerating the vehicle 100, an actuator of a steering device for changing a traveling direction of the vehicle 100, and an actuator of a braking device for decelerating the vehicle 100.

The vehicle control device 110 includes a computer including a processor 111, a memory 112, an input/output interface 113, and an internal bus 114. The processor 111, the memory 112, and the input/output interface 113 are bidirectionally communicably connected via an internal bus 114. An actuator group 120 and a communication device 130 are connected to the input/output interface 113. The processor 111 executes the program PG1 stored in the memory 112 to realize various functions including the functions of the acquisition unit 115, the determination unit 116, and the vehicle control unit 117.

The acquisition unit 115 acquires the result of inspection of the mounted device DE. In the present embodiment, in the inspection process in the manufacturing process of the vehicle 100, the plurality of mounted device DE are inspected while the vehicle 100 is traveling in the remote automated driving mode. Therefore, the acquisition unit 115 acquires the result of inspection of each mounted device DE.

The result of inspection of the mounted device DE is, for example, information in which the device identifier for identifying the mounted device DE is associated with the pass/fail information indicating the pass/fail of the inspection. The result of inspection of the mounted device DE may further include a state quantity indicating a state of the mounted device DE. The acceptance/rejection of the mounted device DE is determined by comparing a reference set in advance with a state quantity in order to determine the acceptance/rejection according to, for example, whether or not the state of the mounted device DE is good. In this case, if the quantity of condition satisfies the criterion, the mounted device DE is determined to be acceptable. If the quantity of condition does not meet the criterion, the mounted device DE is determined to be rejected. The acceptance or rejection of the mounted device DE may be determined by other methods. The acceptance or rejection of the mounted device DE may be determined by, for example, calculating and clustering the similarities of the state quantities of the mounted device DE of the same type at the same acquiring timing acquired for each of the plurality of vehicles 100. Further, the acceptance/rejection of the mounted device DE may be determined, for example, by relatively comparing the time-series data representing the time-series change of the state quantities of the same type of mounted device DE acquired for each of the plurality of vehicles 100.

The determination unit 116 determines whether or not the vehicle can travel in the remote automated driving mode, using the result of inspection of the mounted device DE. In the present embodiment, when it is determined that all of the plurality of mounted device DE inspected as the inspection target pass, the determination unit 116 determines that the vehicle can travel in the remote automated driving mode. On the other hand, when it is determined that any one of the plurality of mounted device DE inspected as the inspection target fails, the determination unit 116 determines that the vehicle cannot travel in the remote automated driving mode. When it is determined that the driving in the remote automated driving mode is impossible, the determination unit 116 executes a class determination process for determining whether or not the driving in the remote manual driving mode is possible.

In the class determination process, the determination unit 116 classifies one of the plurality of classes, for example, according to the degree of the effect on the traveling by the remote manual driving mode, using the result of inspection of the mounted device DE. In this way, the determination unit 116 determines the class according to the result of inspection of the mounted device DE. In other words, in the class determination process, the determination unit 116 classifies one of the plurality of classes according to the degree of the failure of the mounted device DE, that is, the operating state of the mounted device DE. For example, the determination unit 116 classifies the vehicle into one of a plurality of classes according to DE of the mounted device that contributes to determination that the vehicle cannot travel in the remote automated driving mode. That is, the determination unit 116 classifies the mounted device DE into one of a plurality of classes according to the type and combination of the mounted devices determined to be rejected in the inspection. The determination unit 116 may further classify the state quantity of the mounted device DE determined to be rejected in the inspection into any of a plurality of classes.

In the present embodiment, in at least one of the first case and the second case, the determination unit 116 classifies the plurality of classes into a possible class indicating that the vehicle can travel in the remote manual driving mode.

In the first case, the function of the mounted device DE that contributes to determination that the vehicle cannot be driven by the remote automated driving mode, can be compensated by the feeling and operation of the external operator. The sense of the external operator may be, for example, five senses, such as the visual and auditory sense of the external operator, or may be a sense based on experience with a traveling operation. For example, when the mounted device DE that contributes to determination that the vehicle cannot be driven in the remote automated driving mode is an in-vehicle camera that is a kind of an in-vehicle sensor, the vehicle 100 can be driven as follows. In this case, the external operator visually recognizes the captured image displayed on the display of the remote maneuvering device 400 and acquired by imaging the vehicle 100 equipped with the in-vehicle camera determined to be rejected in the inspection by the external camera. As a result, the external operator recognizes the surrounding situation of the vehicle 100 and operates the remote maneuvering device 400, so that the vehicle 100 can be caused to travel by remote control by the external operator. Further, for example, when the mounted device DE that contributes to determination that the vehicle cannot travel in the remote automated driving mode is the steering angle sensor, the vehicle 100 can travel in the following manner. In this case, the external operator visually recognizes the captured image displayed on the display of the remote maneuvering device 400 and acquired by imaging the vehicle 100 equipped with the steering angle sensor determined to be rejected in the inspection by the external camera. As a result, the external operator recognizes the steering angle of the vehicle 100 and the surrounding situation of the vehicle 100, and operates the steering of the remote maneuvering device 400, whereby the vehicle 100 can be caused to travel by remote control by the external operator. As described above, when the mounted device DE that contributes to determination that the vehicle cannot travel in the remote automated driving mode is the mounted sensor, the vehicle can travel in the remote manual driving mode by supplementing it by an external operator. Further, for example, the mounted device DE that contributes to determination that the vehicle cannot travel in the remote automated driving mode, may be an electric parking brake. In this case, when no problem occurs in the electric shift and the disc brake device, the vehicle 100 can be stopped in the following manner. In this case, the external operator depresses the brake pedal of the remote maneuvering device 400 or operates the lever of the remote maneuvering device 400 to set the position of the electric shift mounted on the vehicle 100 as a parking position. Thus, the vehicle 100 can be stopped by remote control of the external operator. Therefore, in the first case, for example, the mounted device DE that contributes to determination that the vehicle cannot travel in the remote automated driving mode is at least one of the mounted sensor and the electric parking brake.

In the second case, the function of one mounted device DE that contributes to determination that the vehicle cannot travel in the remote automated driving mode, can be compensated by another mounted device DE different from one mounted device DE. For example, the mounted device DE that contributes to determination that the vehicle cannot be driven by the remote automated driving mode, may be an electric parking brake. In this case, when no problem occurs in the electric shift or the disc brake device, the vehicle 100 can be stopped as follows. In this case, the external operator depresses the brake pedal of the remote maneuvering device 400 or operates the lever of the remote maneuvering device 400 to set the position of the electric shift mounted on the vehicle 100 as a parking position. Thus, the vehicle 100 can be stopped by remote control of the external operator. Therefore, in the second case, for example, the mounted device DE that contributes to determination that the vehicle cannot be driven by the remote manual driving mode, is an electric parking brake.

When neither of the first case nor the second case corresponds, the determination unit 116 classifies the plurality of classes into an impossible class indicating that the vehicle cannot travel in the remote manual driving mode. The cases that do not correspond to either of the first case and the second case are cases in which, for example, the mounted device DE determined to be rejected in the examination is a motion control system device.

Note that each of the possible class and the impossible class may be constituted by a plurality of classes corresponding to the type, combination, state quantity, and the like of the mounted device DE determined to be rejected in the examination, or may be constituted by a single class. The plurality of classes corresponding to the operating state of the mounted device DE are also referred to as "fail classes".

The determination unit 116 transmits the determination result to the server 200. Specifically, when it is determined that the vehicle can travel in the remote automated driving mode, the determination unit 116 transmits confirmation information indicating that the vehicle can travel in the remote automated driving mode. When it is determined that the vehicle cannot travel in the remote automated driving mode, the determination unit 116 transmits, to the server 200, class information indicating which of the possible class and the impossible class is classified. When at least one of the possible class and the impossible class is composed of a plurality of classes, the determination unit 116 may transmit a class identifier for identifying the plurality of classes to the server 200. For example, a possible class is composed of a first class, a second class, and a third class. And, the impossible class is composed of the fourth class, the fifth class, the sixth class, and the seventh class. In this case, the determination unit 116 transmits a class identifier indicating which class is classified to the server 200.

The vehicle control unit 117 controls the actuator group 120 to cause the vehicle 100 to travel. In the manned driving mode, the vehicle control unit 117 generates a travel control signal in response to an operation of the vehicle maneuvering device 140 mounted on the vehicle 100 by the occupant. The vehicle maneuvering device 140 includes, for example, a steering, an accelerator pedal, a brake pedal, and an electric shift for operating the vehicle 100. Accordingly, the vehicle control unit 117 can cause the vehicle 100 to travel by controlling the actuator group 120 using the generated travel control signal. The travel control signal is a control signal that defines the movement of the vehicle 100 in order to control the movement of the vehicle 100 and cause the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100. In the remote manual driving mode, the vehicle control unit 117 receives a travel control signal generated according to an operation of the remote maneuvering device 400 provided at a location different from the vehicle 100 by the external operator. That is, the vehicle control unit 117 receives the travel control signal manually generated by the external operator via the remote maneuvering device 400. Thus, the vehicle control unit 117 controls the actuator group 120 by using the received travel control signal, so that the vehicle 100 can travel by remote control by an external operator. In the remote automated driving mode, the vehicle control unit 117 receives the travel control signal automatically generated by the server 200 not according to an operation by an external operator. Thus, the vehicle control unit 117 can control the actuator group 120 by using the travel control signal received from the server 200, thereby allowing the vehicle 100 to travel by remote control by the server 200.

Hereinafter, the travel control signal generated according to an operation of the vehicle maneuvering device 140 by the occupant is also referred to as a "manned control signal". The travel control signal generated according to an operation of the remote maneuvering device 400 by the external operator is also referred to as a "manual control signal". The travel control signal generated without using the operation amount of the vehicle maneuvering device 140 and the operation amount of the remote maneuvering device 400 is also referred to as an "automated control signal".

The server 200 includes a computer including a processor 201, a memory 202, an input/output interface 203, and an internal bus 204. The processor 201, the memory 202, and the input/output interface 203 are bidirectionally communicably connected via an internal bus 204. A communication device 205 for communicating with various devices external to the server 200 is connected to the input/output interface 203. The communication device 205 can communicate with the vehicle 100 by wireless communication, and can communicate with each external sensor 300 by wired communication or wireless communication. The processor 201 executes the program PG2 stored in the memory 202 to realize various functions including the functions of the setting unit 211 and the remote control unit 212.

The setting unit 211 sets the driving mode of the vehicle 100 using the determination result of the determination unit 116 received from the vehicle 100. When it is determined that the vehicle can travel in the remote automated driving mode, the setting unit 211 sets the driving mode of the vehicle 100 to the remote automated driving mode. In a case where it is determined that the vehicle cannot travel in the remote automated driving mode, and in a case where it is determined that the vehicle can travel in the remote manual driving mode, the setting unit 211 sets the driving mode of the vehicle 100 to the remote manual driving mode. When it is determined that the vehicle cannot travel in the remote automated driving mode and the remote manual driving mode, the setting unit 211 sets the driving mode of the vehicle 100 to one of the traction driving mode and the manned driving mode.

In the present embodiment, it is determined which driving mode can be used in accordance with the result of inspection of the mounted device DE performed during driving in the remote automated driving mode. Then, the server 200 receives, as a determination result, one of the determination information and the class information from the vehicle 100. Therefore, when the determination information is received from the vehicle 100, the setting unit 211 maintains the driving mode of the vehicle 100 without changing from the remote automated driving mode. In a case where the class information is received from the vehicle 100 and the class specified by the class information is a possible class, the setting unit 211 switches the driving mode of the vehicle 100 from the remote automated driving mode to the remote manual driving mode. When the class information is received from the vehicle 100, the class specified by the class information may be an impossible class. In this case, the setting unit 211 switches the driving mode of the vehicle 100 from the remote automated driving mode to one of the traction driving mode and the manned driving mode.

When the class specified by the class information received from the vehicle 100 is an impossible class, the setting unit 211 executes, for example, the following processing. In this situation, the setting unit 211 sets the driving mode of the vehicle 100 to one of the traction driving mode and the manned driving mode according to the type of the mounted device DE determined to be rejected in the inspection. In the present embodiment, the setting unit 211 determines whether or not the occupant can drive the vehicle 100 by operating the vehicle maneuvering device 140 according to the type of the mounted device DE determined to be rejected in the inspection. When it is determined that the occupant can drive the vehicle 100 by operating the vehicle maneuvering device 140, the setting unit 211 sets the driving mode of the vehicle 100 to the manned driving mode. On the other hand, when it is determined that the vehicle 100 cannot be caused to travel even if the occupant operates the vehicle maneuvering device 140, the setting unit 211 sets the driving mode of the vehicle 100 to the traction driving mode.

For example, the mounted device DE determined to be rejected in the examination may be a driving device related to driving of the vehicle 100 such as an engine, a traveling motor, or a hybrid system among the motion control system devices. In this case, even if the occupant operates the vehicle maneuvering device 140, the vehicle may not be able to travel. In addition, in some cases, the mounted device DE determined to be rejected in the inspection is electrically shifted among the operation control devices. In this case, the traveling direction of the vehicle 100 may not be switched between the forward direction and the backward direction, or the driving mode of the vehicle 100 may not be switched. Accordingly, even if the occupant operates the vehicle maneuvering device 140, the vehicle may not be able to travel on a desired route. Further, even when the mounted device DE determined to be rejected in the examination is a power supply device, the drive device or the like cannot be driven, and even if the occupant operates the vehicle maneuvering device 140, the vehicle may not be able to travel. Therefore, in at least one of a case where the mounted device DE determined to be rejected in the examination is a driving device, a case where the mounted device is electrically shifted, and a case where the mounted device is a power supply device, the setting unit 211 sets, for example, the driving mode of the vehicle 100 to the traction driving mode.

On the other hand, for example, when the mounted device DE determined to be rejected in the examination is an electric power steering device among the driving control system devices, the steering angle of the vehicle 100 can be changed by the occupant operating the steering of the vehicle maneuvering device 140. Further, when the mounted device DE determined to be rejected in the examination is a brake pump in the operation control system device, the vehicle 100 can be decelerated or stopped by the occupant depressing the brake pedal of the vehicle maneuvering device 140. In addition, when the mounted device DE determined to be rejected in the examination is the communication device 130, the vehicle 100 may be allowed to travel by the occupant operating the vehicle maneuvering device 140. That is, when the mounted device DE determined to be rejected in the examination is at least one of the electric power steering device, the brake pump, and the communication device 130, the occupant may travel by operating the vehicle maneuvering device 140. Therefore, when the mounted device DE determined to be rejected in the inspection is at least one of the electric power steering device, the brake pump, and the communication device 130, the setting unit 211 sets, for example, the driving mode of the vehicle 100 to the manned driving mode.

When the driving mode of the vehicle 100 is set to the remote manual driving mode, the setting unit 211 may further execute various processes for enabling the vehicle to travel in the remote manual driving mode. In this case, for example, the setting unit 211 may notify the external operator of information indicating that the driving mode of the vehicle 100 is set to the remote manual driving mode via a notification unit (not shown), and prompt the external operator to operate the remote maneuvering device 400. In addition, the setting unit 211 may be activated by turning on the power of the remote maneuvering device 400 in order to enable the vehicle to travel in the remote manual driving mode. The setting unit 211 may start communication between the remote maneuvering device 400 and the server 200 or start communication between the server 200 and the vehicle 100 in order to enable traveling in the remote manual driving mode. In this way, it is possible to smoothly start traveling in the remote manual driving mode.

When the driving mode of the vehicle 100 is set to at least one of the manned driving mode, the remote manual driving mode, and the remote automated driving mode, the remote control unit 212 generates a travel control signal for controlling the actuator group 120 of the vehicle 100. Then, the remote control unit 212 transmits a travel control signal to the vehicle 100. Thus, the remote control unit 212 causes the vehicle 100 to travel by remote control.

In the remote manual driving mode, the remote control unit 212 generates a manual control signal in accordance with an operation of an external operator located outside the vehicle 100. Specifically, in the remote manual driving mode, an external operator operates the remote maneuvering device 400. Then, the remote control unit 212 of the server 200 acquires the operation amount applied to the remote maneuvering device 400 to generate a manual control signal corresponding to the operation applied to the remote maneuvering device 400. The remote maneuvering device 400 includes, for example, a display for displaying a captured image, steering for remotely controlling the vehicle 100, an accelerator pedal, a brake pedal, and a communication device for communicating with the server 200 through wired communication or wireless communication. The captured image is an image output from at least one of the external camera and the in-vehicle camera.

In the remote automated driving mode, the remote control unit 212 acquires the detection result by the sensor, and generates a travel control signal for controlling the actuator group 120 of the vehicle 100 using the detection result. The remote control unit 212 transmits the generated travel control signal to the vehicle 100 to cause the vehicle 100 to travel by remote control.

In some cases, the driving mode of the vehicle 100 is set to at least one of the manned driving mode and the towing driving mode. In this case, the remote control unit 212 may further notify the operator that the operator needs assistance when the vehicle 100 is moved via a notification unit (not shown). In this way, the operator can be called to the vehicle 100 that needs to be directly moved by the operator.

Figure 2:
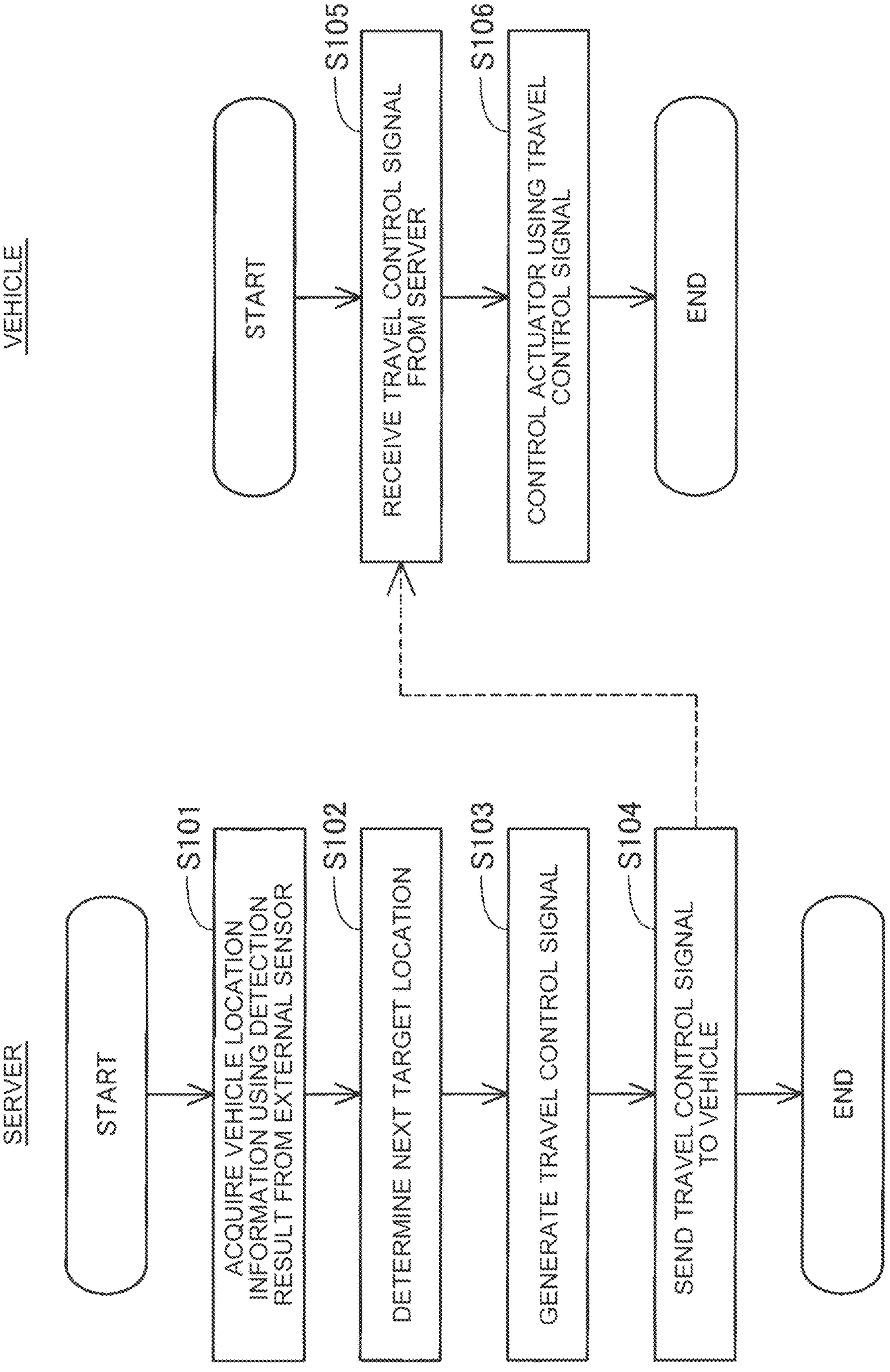
FIG. 2 is a flowchart illustrating a processing procedure of travel control of a vehicle according to the first embodiment.

FIG. 2 is a flowchart illustrating a processing procedure of travel control of the vehicle 100 according to the first embodiment. FIG. 2 illustrates a processing procedure when the vehicle 100 is caused to travel in the remote automated driving mode. The flow illustrated in FIG. 2 is repeatedly executed at predetermined time intervals from the time point when the vehicle 100 starts traveling in the remote automated driving mode during the period in which the control in the remote automated driving mode is being executed. In the process of FIG. 2, the processor 201 of the server 200 functions as the setting unit 211 and the remote control unit 212 by executing the program PG2. The processor 111 of the vehicle 100 executes the program PG1 to function as the acquisition unit 115, the determination unit 116, and the vehicle control unit 117.

In S101, the processor 201 of the server 200 acquires the vehicle position information of the vehicle 100 using the detection result outputted from the external sensor 300. The vehicle position information is position information that is a basis for generating a travel control signal. In the present embodiment, the vehicle position information includes the position and orientation of the vehicle 100 in the global coordinate system of the factory. Specifically, in S101, the processor 201 acquires vehicle-position data using captured images acquired from cameras that are the external sensors 300.

Specifically, in S101, the processor 201 detects the external shape of the vehicle 100 from the captured images, for example. Thereafter, the processor 201 calculates the coordinates of the positioning point of the vehicle 100 in the coordinate system of the captured image, that is, the local coordinate system. Thereafter, the processor 201 obtains the position of the vehicle 100 by converting the calculated coordinates into coordinates in the global coordinate system. The outline of the vehicle 100 included in the captured image can be detected by, for example, inputting the captured image into a detection-model DM using artificial intelligence. The detection-model DM is prepared in the control system 50 or outside the control system 50, for example, and stored in advance in the memory 202 of the server 200. The detected model DM may be, for example, a learned machine learning model learned to implement either semantic segmentation or instance segmentation. As the machine learning model, for example, a convolutional neural network (hereinafter, CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and -label due to the detected-model DM. Further, the processor 201 estimates, for example, based on the orientation of the movement vector of the vehicle 100 calculated from the positional change of the feature point of the vehicle 100 between the frames of the captured image by using the optical flow method. Thus, the processor 201 can acquire the orientation of the vehicle 100.

In S102, the processor 201 of the server 200 determines the target location to which the vehicles 100 should be heading next. In the present embodiment, the target position is represented by the coordinates of X, Y, Z in the global coordinate system. In the memory 202 of the server 200, reference route RR that is a route on which the vehicles 100 should travel is stored in advance. The route is represented by a node indicating a starting point, a node indicating a passing point, a node indicating a destination, and a link connecting the respective nodes. The processor 201 uses the vehicle position information and the reference route RR to determine the target position to which the vehicle 100 is to be directed next. The processor 201 determines the target position on the reference route RR ahead of the current position of the vehicles 100.

In S103, the processor 201 of the server 200 generates a travel control signal for causing the vehicle 100 to travel toward the determined target position. The processor 201 calculates the traveling speed of the vehicle 100 from the transition of the position of the vehicle 100, and compares the calculated traveling speed with the target speed. The processor 201 generally determines the acceleration so that the vehicle 100 accelerates when the travel speed is lower than the target speed, and determines the acceleration so that the vehicle 100 decelerates when the travel speed is higher than the target speed. When the vehicle 100 is located on the reference route RR, the processor 201 determines the steering angle and the acceleration so that the vehicle 100 does not deviate from the reference route RR. On the other hand, when the vehicle 100 is not located on the reference route RR, in other words, when the vehicle 100 deviates from the reference route RR, the processor 201 determines the steering angle and the acceleration so that the vehicle 100 returns to the reference route RR.

In S104, the processor 201 of the server 200 transmits the generated travel control signal to the vehicles 100. The processor 201 repeats acquisition of vehicle position information, determination of a target position, generation of a travel control signal, transmission of a travel control signal, and the like at predetermined intervals.

In S105, the processor 111 of the vehicle 100 receives the travel control signal transmitted from the server 200. In S106, the processor 111 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the control system 50 of the present embodiment, the vehicle 100 can be driven by remote control, and the vehicle 100 can be moved without using a conveyance facility such as a crane or a conveyor.

Figure 3:
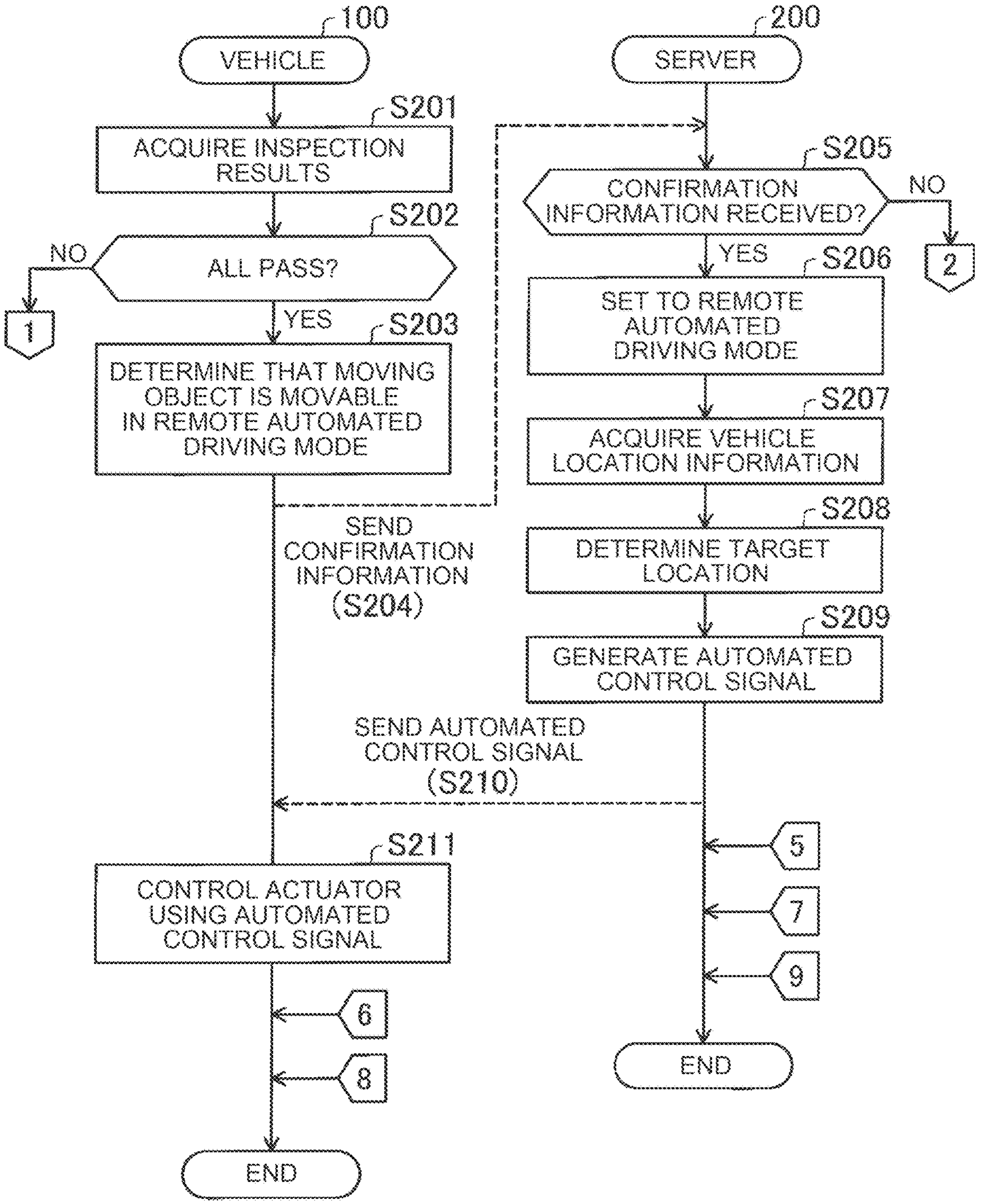
FIG. 3 is a first flowchart showing a method of controlling a vehicle according to a result of inspection of the mounted device.
Figure 4:
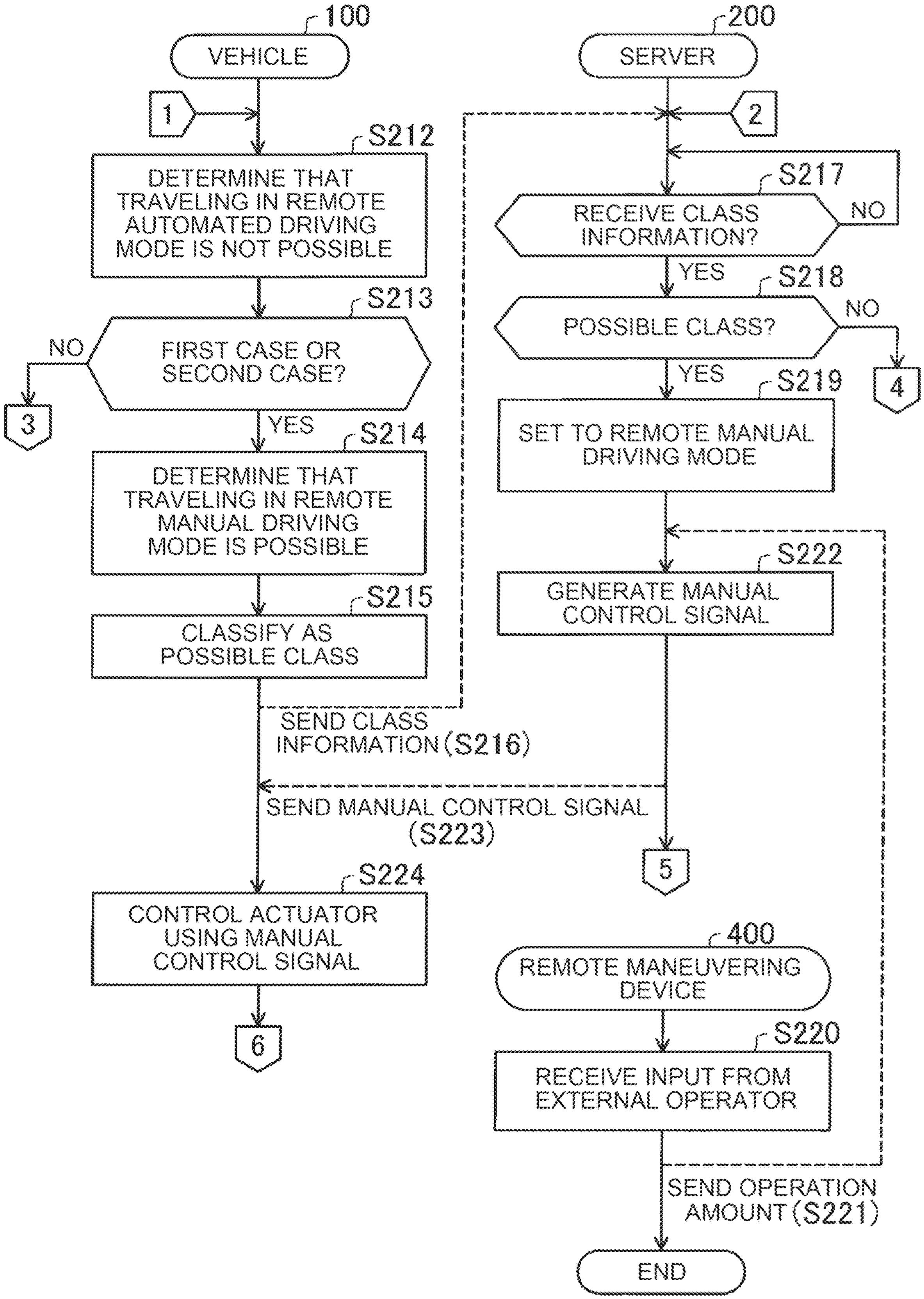
FIG. 4 is a second flowchart showing a method of controlling a vehicle according to the result of inspection of the mounted device.
Figure 5:
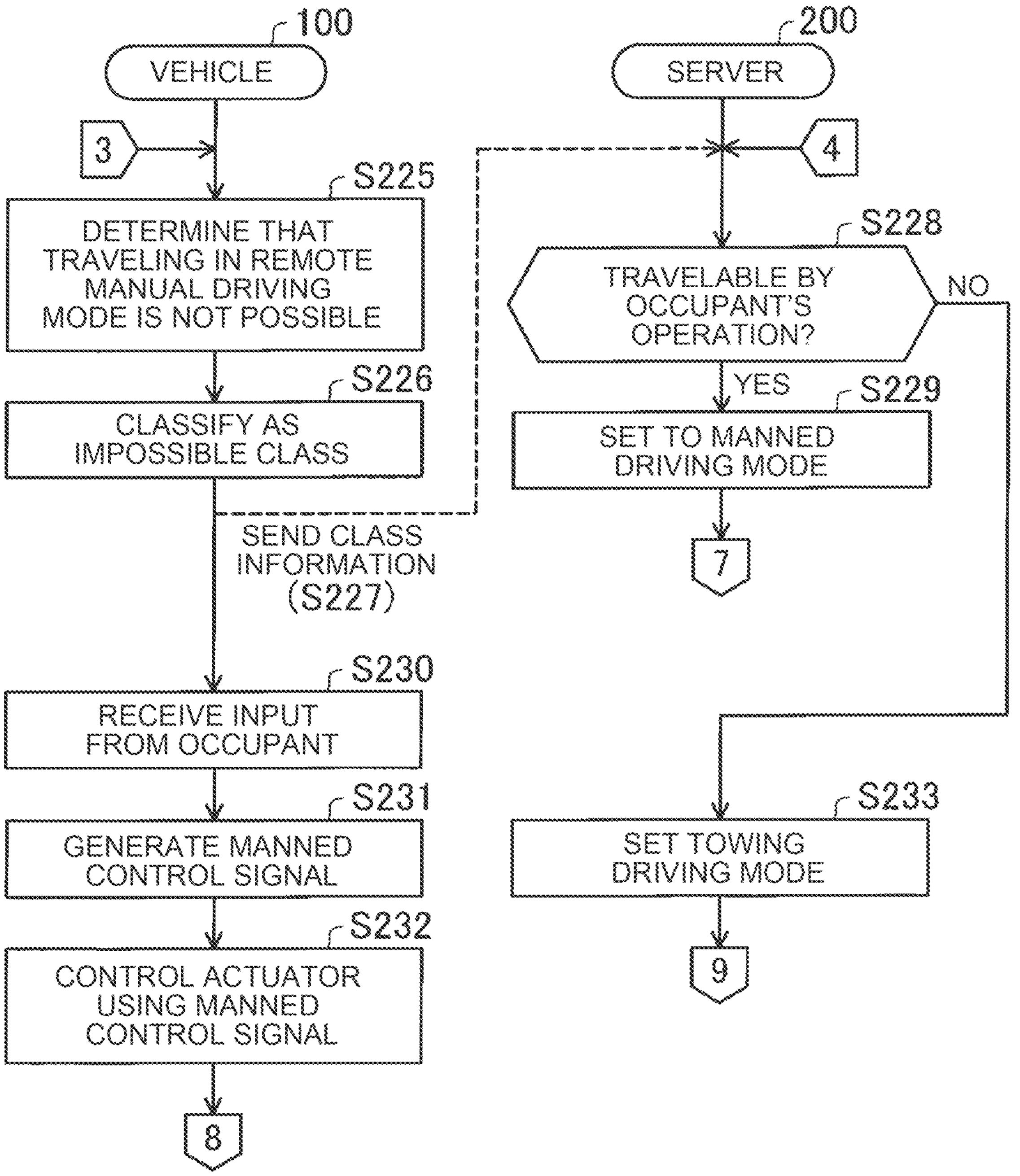
FIG. 5 is a third flowchart showing a method of controlling a vehicle according to the result of inspection of the mounted device.

FIG. 3 is a first flowchart showing how to control the vehicles 100 according to the result of inspection of the mounted device DE. FIG. 4 is a second flowchart showing how to control the vehicles 100 according to the result of inspection of the mounted device DE. FIG. 5 is a third flowchart showing how to control the vehicles 100 according to the result of inspection of the mounted device DE. In each of the diagrams from FIG. 3 to FIG. 5, a process sequence when the vehicle 100 is caused to travel in at least one of a traction driving mode, a manned driving mode, a remote manual driving mode, and a remote automated driving mode is illustrated in accordance with a detected result of the mounted device DE. The flow illustrated in FIGS. 3 to 5 is executed, for example, in order to inspect a plurality of mounted device DE while the vehicles 100 are commissioning in the remote automated driving mode in the factory.

As illustrated in FIG. 3, in S201, the acquisition unit 115 of the vehicle control device 110 mounted on the vehicle 100 acquires the result of inspection of the plurality of mounted device DE for each mounted device DE. In S202, the determination unit 116 determines whether or not the vehicle can travel in the remote automated driving mode.

When all of the plurality of mounted device DE pass (S202: Yes), the determination unit 116 determines that the vehicle can travel in the remote automated driving mode in S203. When it is determined that the vehicle can travel in the remote automated driving mode, the determination unit 116 transmits the determination information to the server 200 in S204. When the determination data is received from the vehicle 100 (S205: Yes), the setting unit 211 of the server 200 sets the driving mode of the vehicle 100 to the remote automated driving mode in S206. In S207, the remote control unit 212 acquires the position information of the vehicle by using the detection result outputted from the camera as the external sensor 300. In S208, the remote control unit 212 determines a target position to which the vehicles 100 are to be directed next. At S209, the remote control unit 212 generates an automated control signal for causing the vehicle 100 to travel toward the determined target position. At S210, the remote control unit 212 transmits the generated automated control signal to the vehicles 100. In S211, the vehicle control unit 117 of the vehicle control device 110 mounted on the vehicle 100 controls the actuator group 120 using the automated control signal received from the server 200. Thus, the vehicle control unit 117 causes the vehicle 100 to travel at the acceleration and the steering angle represented by the automated control signal.

As illustrated in FIG. 3, when any one of the plurality of mounted devices DE fails (S202: No), the determination unit 116 determines that the vehicle cannot travel in the remote automated driving mode in S212 illustrated in FIG. 4. When it is determined that the vehicle cannot travel in the remote automated driving mode, the determination unit 116 executes a classifying process in S213.

In the classifying process, in at least one of the first case and the second case (S213: Yes), the determination unit 116 determines that the vehicle can travel in the remote manual driving mode in S214. As a result, the determination unit 116 classifies S215 into the feasible classes. In S216, the determination unit 116 transmits, to the server 200, class data indicating that the classes are classified as possible classes. In a case where the class information is received from the vehicles 100 (S217: Yes), and in a case where the class specified by the class information is a possible class (S218: Yes), the setting unit 211 executes S219. In S219, the setting unit 211 sets the driving mode of the vehicles 100 to the remote manual driving mode. In S220, the remote maneuvering device 400 receives an input by an operation of an external operator. In S221, the remote maneuvering device 400 transmits the manipulated variable of the external operator to the server 200. In S222, the remote control unit 212 of the server 200 generates a manual control signal using an operation amount of an external operator received from the remote maneuvering device 400. At S223, the remote control unit 212 transmits the generated manual control signal to the vehicles 100. In S224, the vehicle control unit 117 of the vehicle control device 110 mounted on the vehicle 100 controls the actuator group 120 using the manual control signal received from the server 200. Thus, the vehicle control unit 117 causes the vehicle 100 to travel at the acceleration and the steering angle represented by the manual control signal.

When neither of the first case nor the second case is satisfied in the classifying process (S213: No), as illustrated in FIG. 5, in S225, the determination unit 116 determines that the vehicle cannot travel in the remote manual driving mode. As a result, the determination unit 116 classifies it as an impossible-class in S226. In S227, the determination unit 116 transmits, to the server 200, the class information indicating that the class information is classified into the impossible class. As illustrated in FIG. 4, when the class information is received from the vehicles 100 (S217: Yes), and when the class specified by the class information is an impossible class (S218: No), the setting unit 211 executes S228 illustrated in FIG. 5. In S228, the setting unit 211 determines whether the occupant is able to drive the vehicle 100 by operating the vehicle maneuvering device 140. When it is determined that the occupant can drive the vehicle 100 by operating the vehicle maneuvering device 140 (S228: Yes), in S229, the setting unit 211 sets the driving mode of the vehicle 100 to the manned driving mode. In S230, the vehicle maneuvering device 140 receives an input by an operation of an occupant. In S231, the vehicle control unit 117 of the vehicle control device 110 mounted on the vehicle 100 generates a manned control signal using an operation amount of the occupant. In S232, the vehicle control unit 117 controls the actuator group 120 using the generated manned control signal, thereby causing the vehicle 100 to travel at the acceleration and the steering angle represented by the manned control signal. When it is determined that the vehicle 100 cannot be driven by the occupant operating the vehicle maneuvering device 140 (S228: No), the setting unit 211 sets the driving mode of the vehicle 100 to the traction driving mode in S233, and ends this process.

According to the first embodiment, the control system 50 may acquire the result of inspection of the mounted device DE. The control system 50 may determine whether the vehicle can travel in the remote automated driving mode by using the result of inspection of the mounted device DE. If it is determined that the driving in the remote automated driving mode is impossible, the control system 50 can determine whether or not the driving in the remote manual driving mode is possible. Then, the control system 50 can set the driving mode of the vehicle 100 to the remote manual driving mode when it is determined that the driving in the remote automated driving mode is impossible when it is determined that the driving in the remote manual driving mode is possible. Accordingly, the vehicle 100 can travel by executing the following processing when it is determined that the vehicle cannot travel in the remote automated driving mode and that the vehicle can travel in the remote manual driving mode. In this case, the vehicle 100 can travel by remote control by the external operator by controlling the actuator group 120 using a manual control signal generated in response to an operation by the external operator of the remote maneuvering device 400. With this configuration, even when the vehicle 100 cannot be caused to travel in the remote automated driving mode in which automated remote control is performed using a device located outside the vehicle 100 due to the occurrence of a defect in the mounted device DE, the following can be performed. In this case, the vehicle 100 can be moved by the remote manual driving mode in which the operator performs manual remote control by the external operator without directly moving the vehicle 100. That is, the operator can move the vehicle 100 without riding on the vehicle 100 to operate the vehicle maneuvering device 140 or the operator transporting the vehicle 100 using a traction device or the like. As a result, it is possible to reduce the number of man-hours required to move the vehicle 100 as compared with the case where the operator directly moves the vehicle 100.

In some cases, the external operator may be able to compensate for the function of the mounted device DE that contributes to determination that the vehicle cannot be driven by the remote automated driving mode. In this case, according to the first embodiment, the control system 50 can determine that the vehicle can travel in the remote manual driving mode.

Further, according to the first embodiment, a plurality of mounted devices DE are inspected. In this case, the function of one mounted device DE that contributes to determination that the vehicle cannot be driven by the remote automated driving mode may be compensated by the function of another mounted device DE. In this case, the control system 50 can determine that the vehicle can travel in the remote manual driving mode.

In addition, according to the first embodiment, the mounted device DE that contributes to determination that the vehicle cannot travel in the remote automated driving mode, may be at least one of the mounted sensor and the electric parking brake. In this case, the control system 50 can determine that the vehicle can travel in the remote manual driving mode.

Further, according to the first embodiment, the vehicle control device 110 can classify the state of the vehicle 100 into any of a plurality of classes according to the operating state of the mounted device DE and determine whether or not the vehicle can travel in the remote manual driving mode. In this way, it is possible to determine whether or not the vehicle 100 can travel in the remote manual driving mode without preparing a data base in which the propriety of the driving in the remote manual driving mode is associated with all types and all combinations of the various mounted devices DE that differ depending on the type of the vehicle 100. That is, it is only necessary to store a data base corresponding to the type of the mounted device DE of the host vehicle 100 in the respective vehicles 100. The type of the vehicle 100 is, for example, the type of the vehicle 100 when classified according to a trade name, a model, a specification, and the like. Accordingly, it is possible to reduce the load required for preparing the database used for determining whether or not the vehicle can travel in the remote manual driving mode.

B. Second Embodiment

Figure 6:
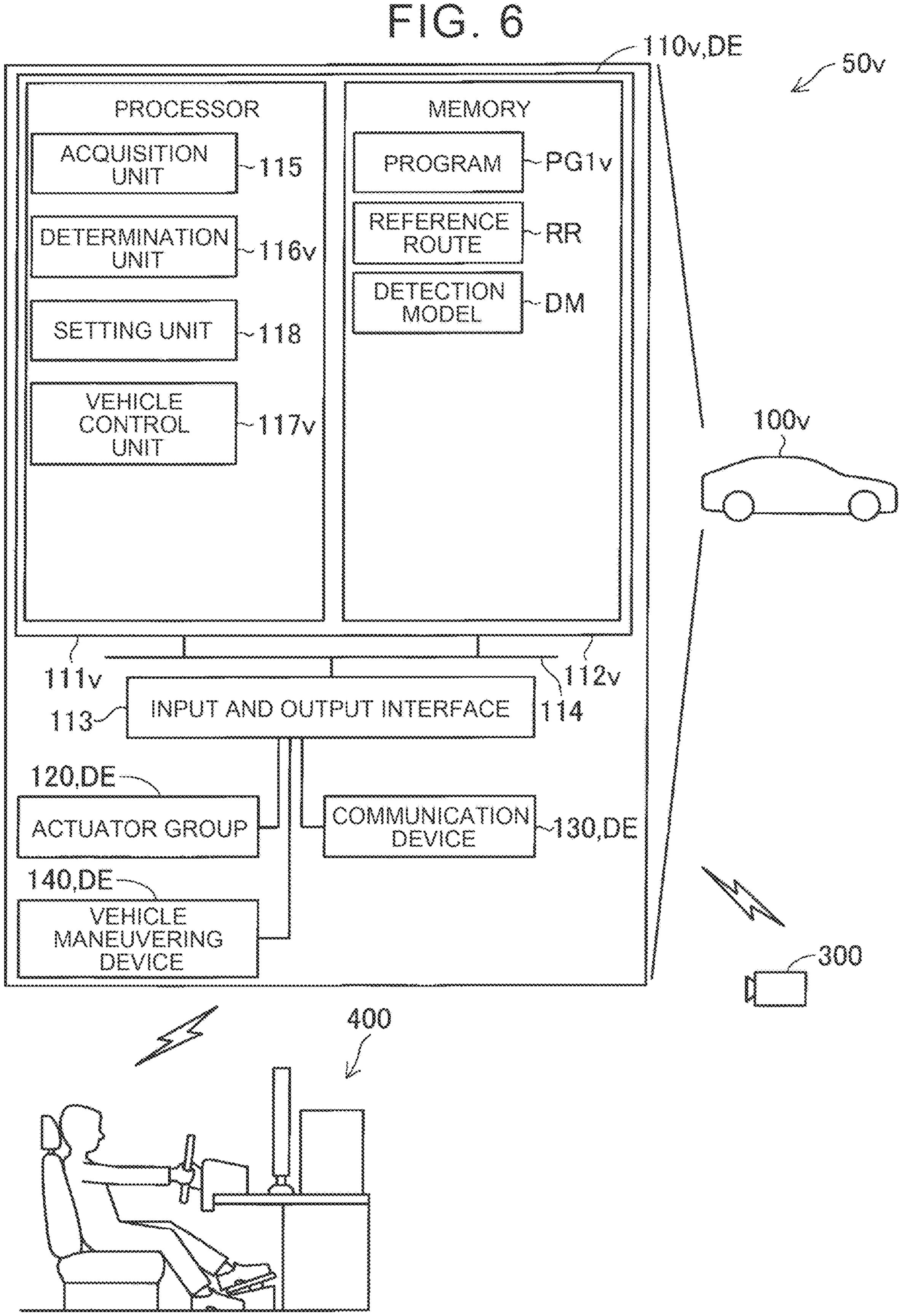
FIG. 6 is an explanatory view showing a schematic configuration of a control system according to a second embodiment.

FIG. 6 is an explanatory diagram illustrating a schematic configuration of a control system 50*v* according to a second embodiment. This embodiment differs from the first embodiment in that the control system 50*v* does not include the server 200. Further, the vehicle 100*v* according to the present embodiment can travel in an autonomous driving mode in which autonomous control of the vehicle 100*v* is performed. Other configurations are the same as those of the first embodiment unless otherwise described.

In the present embodiment, the processor 111*v* of the vehicle control device 110*v* functions as the acquisition unit 115, the determination unit 116*v*, the setting unit 118, and the vehicle control unit 117*v* by executing the program PG1*v* stored in the memory 112*v*.

The determination unit 116*v* determines whether or not the vehicle can travel in the autonomous driving mode. When it is determined that the vehicle cannot travel in the autonomous driving mode, the determination unit 116*v* determines whether or not the vehicle can travel in the remote manual driving mode. When it is determined that the vehicle cannot travel in the remote manual driving mode, the determination unit 116*v* determines whether or not the vehicle can travel in the manned driving mode.

When the determination unit 116*v* determines that the vehicle can travel in the autonomous driving mode, the setting unit 211 sets the driving mode of the vehicle 100*v* to the autonomous driving mode. When the determination unit 116*v* determines that the vehicle cannot travel in the autonomous driving mode but can travel in the remote manual driving mode, the setting unit 211 sets the driving mode of the vehicle 100*v* to the remote manual driving mode. When the determination unit 116*v* determines that the vehicle cannot be driven in the autonomous driving mode and the remote manual driving mode, but the vehicle can be driven in the manned driving mode, the setting unit 118 sets the driving mode of the vehicle 100*v* to the manned driving mode. When the determination unit 116*v* determines that the vehicle cannot travel in the autonomous driving mode, the remote manual driving mode, and the manned driving mode, the setting unit 118 sets the driving mode of the vehicle 100*v* to the traction driving mode.

In the autonomous driving mode, the vehicle control unit 117*v* acquires an output result of the sensor and generates a travel control signal using the output result. Thus, the vehicle control unit 117*v* can cause the vehicle 100*v* to travel by autonomous control by outputting the generated travel control signal and operating the actuator group 120. In the present embodiment, in addition to the program PG1*v*, the detection-model DM and the reference route RR are stored in advance in the memory 112*v*. Note that the functions of the vehicle control unit 117*v* in the manned driving mode and the remote manual driving mode are the same as those of the vehicle control unit 117 of the server 200 described in the first embodiment.

Figure 7:
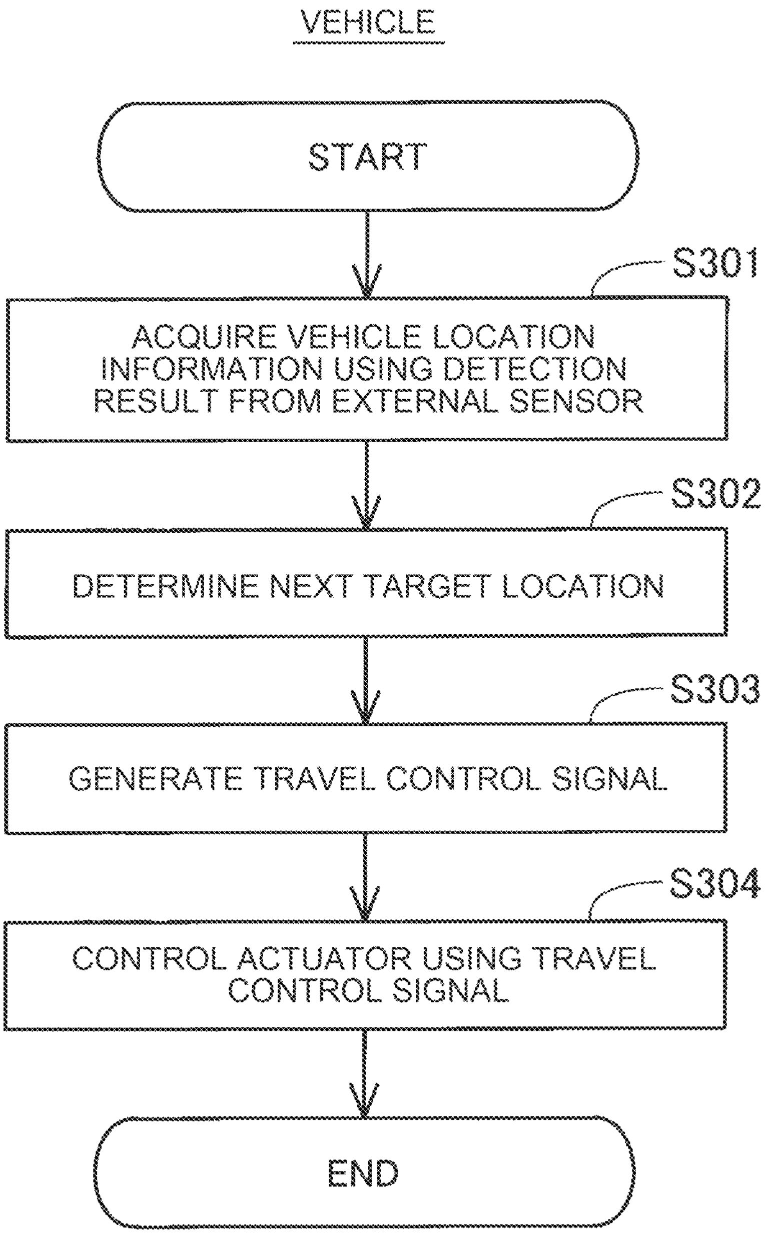
FIG. 7 is a flowchart illustrating a processing procedure of travel control of the vehicle according to the second embodiment.

FIG. 7 is a flowchart showing a process sequence of travel control of the vehicle 100*v* according to the second embodiment. FIG. 7 is a flowchart illustrating a process of driving the vehicle 100*v* in the autonomous driving mode. The flow illustrated in FIG. 7 is repeatedly executed at predetermined time intervals from the time point when the vehicle 100 starts traveling in the autonomous driving mode during the period in which the control in the autonomous driving mode is being executed. In the process of FIG. 7, the processor 111*v* of the vehicle 100*v* functions as the acquisition unit 115, the determination unit 116*v*, the setting unit 118, and the vehicle control unit 117*v* by executing the program PG1*v*.

In S301, the processor 111*v* of the vehicle control device 110*v* acquires the vehicle position information using the detection result outputted from the camera as the external sensor 300. In S302, the processor 111*v* determines the target position to which the vehicle 100*v* should be headed next. In S303, the processor 111*v* generates a travel control signal for causing the vehicle 100*v* to travel toward the determined target position. In S304, the processor 111*v* controls the actuator group 120 by using the generated travel control signal, thereby causing the vehicle 100*v* to travel in accordance with the parameter represented by the travel control signal. The processor 111*v* repeats acquiring the vehicle position information, determining the target position, generating the travel control signal, and controlling the actuator at a predetermined cycle.

According to the second embodiment, the control system 50*v* can cause the vehicle 100*v* to travel by autonomous control of the vehicle 100*v* without remotely controlling the vehicle 100*v* by the server 200 while the control of the autonomous driving mode is executed.

Further, according to the second embodiment, even when the vehicle 100*v* cannot be driven by the autonomous driving mode in which autonomous control of the vehicle 100*v* is performed due to the failure of the mounted device DE, the following can be performed. Thus, the vehicle 100*v* can be moved by manual remote control by an external operator without the operator directly moving the vehicle 100*v*. As a result, it is possible to reduce the number of man-hours required to move the vehicle 100*v* as compared with a case where the operator directly moves the vehicle 100*v*.

C. Other Embodiments

C-1. Other Embodiments 1

At least some of the functions of the server 200 may be one function of the vehicle control device 110, 110*v* or one function of the external sensor 300. Further, at least some of the functions of the vehicle control device 110, 110*v* may be one function of the server 200 or one function of the external sensor 300. That is, the control device including the acquisition unit 115, the determination unit 116, and the setting unit 118,211 may be the server 200 or the vehicle control device 110, 110*v*. Further, each function of the server as the control device may be realized by a plurality of servers. In a case where each function of the control device is realized by a plurality of servers, the control system 50 may further include a server 200 having a function other than the function described in the first embodiment. In this case, the control system 50 may include, for example, a self-propelled transport server, a self-propelled control server, a remote driving server, an inspection server, and a notification server. The self-propelled transport server has the same functions as those of the acquisition unit 115, the determination unit 116, and the setting unit 118,211, for example. That is, the self-propelled transport server has a function of determining which of the manned driving mode, the remote manual driving mode, and the automated driving mode the vehicle 100 is caused to travel in, and setting the driving mode according to the determination result. The self-propelled control server has a function of automatically generating an automated control signal using vehicle position information and the like among the functions of the remote control unit 212 and transmitting the automated control signal to the vehicle 100. That is, the self-propelled control server is used for traveling in the remote automated driving mode. The remote driving server has, among the functions of the remote control unit 212, a function of generating a manual control signal in response to an operation by an external operator of the remote maneuvering device 400 and transmitting the manual control signal to the vehicle 100. The inspection server has a function of executing an inspection of the mounted device DE. The notification server transmits, at a predetermined cycle, information on an object existing in the vicinity of the runway and the vehicle 100 to at least one of the self-propelled transport server and the automated control server. Objects present on the runway and around the vehicle 100 may be moving objects such as, for example, humans and AGV, and may be stationary objects such as manufacturing facilities and signboards. Even in such a configuration, when the vehicle 100 cannot be caused to travel in the automated driving mode due to a failure of the mounted device DE, the following can be performed. In this case, the vehicle 100 can be moved by manual remote control by an external operator without the operator directly moving the vehicle 100.

C-2. Other Embodiments 2

The mounted device DE may be inspected prior to driving the vehicles 100 in the automated driving mode. For example, in the assembly process of assembling the mounted device DE to the vehicle 100, the mounted device DE may be inspected after the mounted device DE is assembled to the vehicle 100. With this configuration, the control system 50, 50*v* can be set to the driving mode according to the operating state of the mounted device DE prior to starting the travel in the automated driving mode.

C-3. Other Embodiments 3

The determination unit 116, 116*v* may be one function of the servers 200. In this case, the determination unit 116, 116*v* may determine whether or not the vehicle is allowed to travel in the remote manual driving mode by using a data base in which the type and combination of the mounted device DE and whether or not the vehicle is allowed to travel in the remote manual driving mode are associated with each other. The database in which the types of the mounted device DE and the combinations and the propriety of the driving in the remote manual driving mode are associated with each other is a database stored in the memory 202 of the server 200. Even in such a configuration, the vehicle 100 can be moved by manual remote control by an external operator without the operator directly moving the vehicle 100.

C-4. Other Embodiments 4

The vehicle 100, 100*v* may have a remote manual driving mode, a manned driving mode, and a towing driving mode without having an automated driving mode. In this case, for example, the acquisition unit 115 acquires the result of inspection of the mounted device DE performed while the vehicle 100, 100*v* is traveling in the manned driving mode. The determination unit 116, 116*v* determines whether the vehicle can be moved in the manual driving mode without determining whether the vehicle can be moved in the automated driving mode by using the result of inspection of the mounted device DE. When it is determined that the vehicle can be moved in the remote manual driving mode, the setting unit 118,211 sets the driving mode of the vehicle 100, 100*v* to the remote manual driving mode. Even in such a configuration, when a failure occurs in the mounted device DE, the vehicle 100, 100*v* can be moved by the remote manual driving mode without the operator directly moving the vehicle 100, 100*v*.

C-5. Other Embodiments 5

In each of the above embodiments, the external sensor 300 is a camera. On the other hand, the external sensor 300 may not be a camera, and may be a distance measuring device such as a LiDAR (Light Detection And Ranging). In this case, the detection result output by the external sensor 300 may be three-dimensional point cloud data representing the vehicle 100. In this case, the server 200 or the vehicle 100 may acquire the vehicle position information by template matching using three-dimensional point cloud data as a detection result and reference point cloud data prepared in advance.

C-6. Other Embodiments 6

In the first embodiment, the server 200 executes processing from acquisition of vehicle position information to generation of a travel control signal. On the other hand, at least a part of the processing from the acquisition of the vehicle position information to the generation of the travel control signal may be executed by the vehicle 100. For example, the following forms (1) to (3) may be used.

(1) The server 200 may acquire the vehicle position information, determine a target position to which the vehicle 100 should be heading next, and generate a route from the current position of the vehicle 100 represented by the acquired vehicle position information to the target position. The server 200 may generate a route to a target position between the current location and the destination, or may generate a route to the destination. The server 200 may transmit the generated route to the vehicle 100. The vehicle 100 may generate a travel control signal so that the vehicle 100 travels on the route received from the server 200, and control the actuator group 120 using the generated travel control signal.

(2) The server 200 may acquire the vehicle position information and transmit the acquired vehicle position information to the vehicle 100. Vehicle 100 determines the target position to which vehicle 100 should be heading next. Then, the vehicle 100 generates a route from the current position of the vehicle 100 to the target position represented by the received vehicle position information. The vehicle 100 generates a travel control signal so that the vehicle 100 travels on the generated route. The vehicle 100 may control the actuator group 120 using the generated travel control signal.

(3) In the above embodiments (1) and (2), an internal sensor may be mounted on the vehicle 100, and a detection result output from the internal sensor may be used for at least one of generation of a route and generation of a travel control signal. The internal sensor is a sensor mounted on the vehicle 100. The internal sensor may include, for example, a sensor that detects a motion state of the vehicle 100, a sensor that detects an operating state of each unit of the vehicle 100, and a sensor that detects an environment around the vehicle 100. Specifically, the inner sensor may include, for example, a camera, a LiDAR, a millimeter-wave radar, an ultrasonic sensor, a GPS sensor, an accelerometer, a gyroscope, and the like. For example, in the embodiment (1), the server 200 may acquire the detection result of the internal sensor and reflect the detection result of the internal sensor in the path when generating the path. In the aspect (1), the vehicle 100 may acquire the detection result of the internal sensor and reflect the detection result of the internal sensor in the travel control signal when generating the travel control signal. In the aspect (2), the vehicle 100 may acquire the detection result of the internal sensor and reflect the detection result of the internal sensor in the path when generating the path. In the aspect (2), the vehicle 100 may acquire the detection result of the internal sensor and reflect the detection result of the internal sensor in the travel control signal when generating the travel control signal.

C-7. Other Embodiments 7

In the second embodiment, an internal sensor may be mounted on the vehicle 100*v*, and a detection result outputted from the internal sensor may be used for at least one of generation of a route and generation of a travel control signal. For example, the vehicle 100*v* may acquire the detection result of the internal sensor and reflect the detection result of the internal sensor in the route when generating the route. The vehicle 100*v* may acquire the detection result of the internal sensor and reflect the detection result of the internal sensor in the travel control signal when generating the travel control signal.

C-8. Other Embodiments 8

In the second embodiment, the vehicle 100*v* acquires the vehicle position information using the detection result of the external sensor 300. On the other hand, an inner sensor is mounted on the vehicle 100*v*. The vehicle 100*v* acquires the vehicle position information by using the detection result of the inner sensor, and determines a target position to which the vehicle 100*v* is to be directed next. Then, the vehicle 100*v* generates a route from the current position of the vehicle 100*v* to the target position, which is represented by the acquired vehicle position data. The vehicle 100*v* may further generate a travel control signal for traveling on the generated route, and control the actuator group 120 using the generated travel control signal. In this case, the vehicle 100*v* can travel without using the detection result of the external sensor 300 at all. The vehicle 100*v* may acquire the target arrival time and the traffic jam information from the outside of the vehicle 100*v* and reflect the target arrival time and the traffic jam information on at least one of the route and the travel control signal. In addition, all the functional configurations of the control system 50*v* may be provided in the vehicle 100*v*. In other words, the process implemented by the control system 50*v* may be implemented by the vehicle 100*v* alone.

C-9. Other Embodiments 9

In the above-described embodiments, the vehicle 100, 100*v* may have a configuration that can be moved by unmanned driving, and may be, for example, in the form of a platform that includes the configuration described below. Specifically, the vehicle 100, 100*v* may include at least a vehicle control device 110, 110*v* and an actuator group 120 in order to perform the following three functions by unmanned driving: "run," "turn," and "stop." When the vehicle 100, 100*v* acquires information from the outside for unmanned driving, the vehicle 100, 100*v* may further include a communication device 130. That is, the vehicle 100, 100*v* that can be moved by the unmanned driving may not be equipped with at least a part of the interior components such as the driver's seat and the dashboard. In addition, at least a part of an exterior component such as a bumper or a fender may not be attached to the vehicle 100, 100*v*. The vehicle 100, 100*v* may not be fitted with a body shell. In this instance, the remaining components, such as the body shell, may be mounted on the vehicle 100, 100*v* until the vehicle 100, 100*v* is shipped from the factory. In addition, the vehicle 100, 100*v* may be equipped with the remaining components such as the body shell after the vehicle 100, 100*v* is shipped from the factory while the remaining components such as the body shell are not mounted on the vehicle 100, 100V. Each component may be attached from any direction, such as the upper, lower, front, back, right or left side of the vehicle 100, 100*v*, may be attached from the same direction, each may be attached from different directions. It should be noted that the position determination can be performed in the same manner as in the vehicle 100, 100*v* according to the first embodiment.

C-10. Other Embodiments 10

The vehicle 100, 100*v* may be manufactured by combining a plurality of modules. The modular means a unit composed of a plurality of components arranged according to a part or a function of a vehicle 100, 100*v*. For example, a vehicle 100, 100*v* may be manufactured by combining a front module, a central module, and a rear module. The front module constitutes the front of the platform. The central module constitutes the central part of the platform. The rear module constitutes the rear of the platform. The number of modules constituting the platform is not limited to three, and may be two or less or four or more. In addition to or instead of the components constituting the platform, components constituting parts of the vehicle 100, 100*v* that differ from the platform may be modularized. Further, the various modules may include any exterior parts such as bumpers and grills, and any interior parts such as sheets and consoles. In addition, the present disclosure is not limited to a vehicle 100, 100*v*, and a moving object of any aspect may be manufactured by combining a plurality of modules. Such a module may be manufactured, for example, by joining a plurality of parts by welding, a fixture, or the like, or may be manufactured by integrally molding at least a part of the parts constituting the module as one part by casting. Molding techniques for integrally molding one part, in particular a relatively large part, are also called gigacasting or megacasting. For example, the front module, the central module, and the rear module described above may be manufactured using gigacasting.

C-11. Other Embodiments 11

Transporting the vehicle 100, 100*v* by using the traveling of the vehicle 100, 100*v* by the unmanned driving is also referred to as "self-propelled conveyance". A configuration for realizing self-propelled conveyance is also referred to as a "vehicle remote control autonomous driving conveyance system". Further, a production method of producing a vehicle 100, 100*v* by using self-propelled conveyance is also referred to as "self-propelled production". In self-propelled manufacturing, for example, at least a part of conveyance of the vehicle 100 is realized by self-propelled conveyance in a factory that manufactures the vehicle 100, 100*v*.

C-12. Other Embodiments 12

In each of the above-described embodiments, some or all of the functions and processes implemented in software may be implemented in hardware. In addition, some or all of the functions and processes implemented in hardware may be implemented in software. For example, various circuits such as an integrated circuit and a discrete circuit may be used as hardware for realizing various functions in the above-described embodiments.

The present disclosure is not limited to each of the above embodiments, and can be realized by various configurations without departing from the spirit thereof. For example, the technical features of the embodiments corresponding to the technical features in the respective embodiments described in the Summary can be appropriately replaced or combined in order to solve some or all of the above-described problems or to achieve some or all of the above-described effects. Further, when the technical features are not described as essential in the present specification, these can be deleted as appropriate.

What is claimed is:

1. A control device controlling movement of a moving object that is movable by unmanned driving, the moving object having a remote manual driving mode and an automated driving mode, the moving object in the remote manual driving mode receiving a manual control signal and moving using the received manual control signal, the manual control signal being a signal generated according to an operation of a maneuvering device by an external operator to control movement of the moving object, the maneuvering device being located at a different location from the moving object, the moving object in the automated driving mode moving using an automated control signal generated other than according to the operation of the maneuvering device by the external operator to control the movement of the moving object, the moving object including a plurality of mounted devices mounted on the moving object, the control device comprising a processor configured to acquire results of inspection of the mounted devices, and determine whether the moving object is movable in the automated driving mode based on the results of inspection, wherein the processor is further configured to determine whether the moving object is movable in the remote manual driving mode based on the results of inspection, in response to determining that the moving object is not movable in the automated driving mode, and set a driving mode of the moving object to the remote manual driving mode in response to determining that the moving object is movable in the remote manual driving mode, and the moving object is determined to be movable in the remote manual driving mode in a case where a function of a first mounted device of the mounted devices that contributes to the determination that the moving object is not movable in the automated driving mode is able to be compensated for by a function of a second mounted device of the mounted devices that is different from the first mounted device.

2. The control device according to claim 1, wherein the moving object is further determined to be movable in the remote manual driving mode in a case where the function of a third mounted device of the mounted devices that contributes to the determination that the moving object is not movable in the automated driving mode is able to be compensated for by the external operator.

3. The control device according to claim 1, wherein the moving object is determined to be movable in the remote manual driving mode in a case where the first mounted device that contributes to the determination that the moving object is not movable in the automated driving mode is either or both of a mounted sensor that is a sensor mounted on the moving object and an electric parking brake.

4. A control system controlling movement of a moving object that is movable by unmanned driving, the control system comprising:

the moving object on which a plurality of mounted devices is mounted, the moving object having a remote manual driving mode and an automated driving mode; and a processor configured to acquire results of inspection of the mounted devices, and determine whether the moving object is movable in the automated driving mode based on the results of inspection, wherein the processor is further configured to determine whether the moving object is movable in the remote manual driving mode in response to determining that the moving object is not movable in the automated driving mode, and set a driving mode of the moving object to the remote manual driving mode in response to determining that the moving object is movable in the remote manual driving mode, the moving object is determined to be movable in the remote manual driving mode in a case where a function of a first mounted device of the mounted devices that contributes to the determination that the moving object is not movable in the automated driving mode is able to be compensated for by a function of a second mounted device of the mounted devices that is different from the first mounted device, the moving object in the remote manual driving mode receives a manual control signal and moves using the received manual control signal, the manual control signal being a signal generated according to an operation of a maneuvering device by an external operator to control movement of the moving object, and the maneuvering device being located at a different location from the moving object, and the moving object in the automated driving mode moves using an automated control signal generated other than according to the operation of the maneuvering device by the external operator to control the movement of the moving object.

5. The control device according to claim 1, wherein the results of inspection of the mounted devices include pass-fail information of the mounted devices, and the pass-fail information of each of the mounted devices is determined by calculating and clustering similarities of state quantities of mounted devices of the same type at the same acquiring timing acquired from a plurality of moving objects.

6. The control device according to claim 1, wherein the results of inspection of the mounted devices include pass-fail information of the mounted devices, and state quantities indicating states of the mounted devices, and the pass-fail information of each of the mounted devices is determined by comparing time-series data representing a time-series change of state quantities of the same type of mounted devices acquired from a plurality of moving objects.

7. The control device according to claim 1, wherein the results of inspection of the mounted devices include operating states of the mounted devices, and the processor is further configured to classify the moving object into one class of a plurality of classes based on the operating states of the mounted devices, the operating states of the mounted devices indicating degrees of failures of the mounted devices.

* * * * *